US009069860B2

(12) United States Patent
Matesso et al.

(10) Patent No.: US 9,069,860 B2
(45) Date of Patent: *Jun. 30, 2015

(54) COMPUTER-AIDED EXTRACTION OF SEMANTICS FROM KEYWORDS TO CONFIRM MATCH OF BUYER OFFERS TO SELLER BIDS

(71) Applicant: Semantic Search Technologies LLC, Fresno, CA (US)

(72) Inventors: Bruce Matesso, Los Gatos, CA (US); Richard Bridgeman, Saratoga, CA (US)

(73) Assignee: Semantic Search Technologies LLC, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,342

(22) Filed: Jan. 27, 2014

(65) Prior Publication Data
US 2014/0188867 A1 Jul. 3, 2014

Related U.S. Application Data

(63) Continuation of application No. 13/546,272, filed on Jul. 11, 2012, now Pat. No. 8,793,237, which is a continuation of application No. 11/213,145, filed on Aug. 25, 2005, now Pat. No. 8,244,726.

(60) Provisional application No. 60/606,357, filed on Aug. 31, 2004.

(51) Int. Cl.
G06F 17/30 (2006.01)
G06Q 30/08 (2012.01)

(52) U.S. Cl.
CPC .......... *G06F 17/30864* (2013.01); *G06Q 30/08* (2013.01); *G06F 17/3064* (2013.01); *G06F 17/3053* (2013.01)

(58) Field of Classification Search
CPC ...................... G06F 17/3064; G06F 17/30554
USPC .................................................. 707/732–734
See application file for complete search history.

(56) References Cited

U.S. PATENT DOCUMENTS

| 5,802,493 | A | 9/1998 | Sheflott et al. |
| 5,930,787 | A | 7/1999 | Kashiwagi et al. |
| 6,018,738 | A | 1/2000 | Breese et al. |
| 6,076,088 | A | 6/2000 | Allen et al. |
| 6,105,022 | A | 8/2000 | Kawaguchi et al. |
| 6,138,116 | A | 10/2000 | Kitagawa et al. |
| 6,144,964 | A | 11/2000 | Breese et al. |
| 6,212,532 | B1 | 4/2001 | Johnson et al. |
| 6,345,264 | B1 | 2/2002 | Breese et al. |
| 6,353,813 | B1 | 3/2002 | Breese et al. |
| 6,732,090 | B2 | 5/2004 | Shanahan et al. |
| 6,772,139 | B1 | 8/2004 | Smith, III |
| 6,778,979 | B2 | 8/2004 | Grefenstette et al. |
| 7,330,852 | B2 * | 2/2008 | Bailey et al. |
| 7,502,787 | B2 * | 3/2009 | Bailey et al. |

(Continued)

FOREIGN PATENT DOCUMENTS

WO WO 0122251 3/2001

*Primary Examiner* — Debbie Le
(74) *Attorney, Agent, or Firm* — Staniford Tomita LLP

(57) ABSTRACT

One embodiment involves a method and apparatus for mapping lexical keywords into entity description semantics in order to create unambiguous buyer-confirmed descriptions of entities. The method described herein relies on a computer program and some mechanism for computer data storage.

19 Claims, 7 Drawing Sheets

(56) References Cited

U.S. PATENT DOCUMENTS

| | | |
|---|---|---|
| 7,805,339 B2 * | 9/2010 | Ashkenazi et al. ........ 705/26.64 |
| 7,996,428 B2 * | 8/2011 | Neal ............................ 707/793 |
| 8,244,726 B1 | 8/2012 | Matesso et al. |
| 8,352,496 B2 | 1/2013 | Johnston |
| 2002/0007307 A1 * | 1/2002 | Miller et al. .................... 705/14 |
| 2002/0091688 A1 | 7/2002 | Decary et al. |
| 2002/0188599 A1 | 12/2002 | McGreevy |
| 2003/0217052 A1 | 11/2003 | Rubenczyk et al. |
| 2004/0243568 A1 | 12/2004 | Wang et al. |
| 2004/0249795 A1 | 12/2004 | Brockway et al. |
| 2005/0203888 A1 * | 9/2005 | Woosley et al. .................. 707/3 |

* cited by examiner

```
<TOP>
    <H apparel EL=men, women, children>
    <H men EL=outerwear, shoe, hat, trouser, shirt>
    <H women EL=outerwear, shoe, hat, slack, blouse, skirt>
    <H children EL=boy, girl>
    <H boy EL= outerwear, shoe, hat, slack, blouse, skirt>
    <H outerware EL=sweater, jacket, coat>
    <H sweater EL=NULL>
</TOP>
Examples of valid hierarchical category descriptions:
a) apparel.men.outerwear.sweater
b) apparel.women.outerwear.sweater
c) apparel.children.boys.outerwear.sweater
```

FIG. 5

```
<ITEM>
<generic_name="sweater">
<manufacturer_product_name="Top drawer cardigan sweater">
<generic_color=("blue" | "green" | "tan" | "brown")>
<manufacturer_color=("teal" | "spring" | "taupe" | "chocolate brown")
<manufacturer_name="Monsanto">
<generic_style=("Crew neck" | "Cardigan") >
<size=("Men's Large" | "Men's Medium" | "Men's X-Large")>
<Manufacturer_PID="0134056B">
</ITEM>
```

FIG. 6

```
<ATTRIBUTE_RANK>
<generic_name=L>
<manufacturer_product_name=MED>
<generic_color=HIGH>
<manufacturer_color=LOW>
<manufacturer_name=MED>
<generic_style=MED>
<size=HIGH>
<Manufacturer_PID=LOW>
</ATTRIBUTE_RANK>
```

FIG. 7

COMPUTER-AIDED EXTRACTION OF SEMANTICS FROM KEYWORDS TO CONFIRM MATCH OF BUYER OFFERS TO SELLER BIDS

RELATED APPLICATION(S)

This is a Continuation Application of U.S. patent application Ser. No. 11/213,145, which was filed on Aug. 25, 2005, which in turn claims priority from U.S. Provisional Application 60/606,357, filed Aug. 31, 2004, which is incorporated herein by reference.

BACKGROUND OF INVENTION

There are many descriptions of computer-aided searches of large search spaces, such as the world wide web, whereby narrowing the search space to a successively smaller and more precise area of interest is accomplished using one or more algorithms involving lexicons.

One problem with the use of lexicons is the limitation inherent in a pure textual search. For example, although a lexical search of the world wide web for matches to "blue sweater" might be refined through human-computer interactions to the more specific "blue sweater crew neck men's large", the resulting search result set is likely to include citations for:

(A) Descriptions of an article of men's apparel known as a sweater and having elements of fashion known as a crew-neck and available in size large and extra-large.
(B) Descriptions of an article of men's apparel known as a sweater and having elements of fashion known as a crew-neck and available at large department stores.
(C) Many reprints and quotes from an often quoted article on the hardworking men on the crew of the Blue Man Group and their experiences during their tour of large cities.

In the above case, the intended search scope is best characterized by the citation in item A. Item B is closer, however there was no semantic meaning to the keyword "large" to indicate that "large" should be used to modify the size of the article of apparel rather than to modify the size of the department store. Item C is wildly out of scope as compared to the buyer's intended search space, yet scores a hit (match) on the refined search terms.

Even more sophisticated computer-aided lexical searches employing lexical associations do not appreciably and consistently reduce the occurrences of search results returning citations that are wildly outside of the target scope (false hits). One commonly employed partial solution to the shortcomings of a pure lexical search is to inject lexical associations into the lexical refinements. Prior attempts to inject lexical associations into computer-aided searches have relied on the existence of a virtual expert advisor, or other access to a domain-specific knowledgebase. In practice such implementations merely inject lexical associations iteratively, resulting in the construction of longer and longer search strings. This technique can result in a rapid narrowing of the search space, however this technique does not reliably eliminate or reduce the occurrence of false hits or wildly out of scope citations.

It has been observed that when humans interact with computer-aided search engines (e.g., Google, eBay.com) in search of products, services or information, they frequently provide keywords that tend to be values or characteristics of the desired products, services or information. For example, when searching for an automobile, the keyword string might be:

"1997 Mustang red convertible"

where each of the above keywords is the value of an implied attribute. A human would imply the following attributes;

Implied Attributes={Model_year, Model_name, Exterior_color, Body_style}

Furthermore, a human would infer a mapping of the keywords to attributes as follows:

Mapping: { Model_year=1997,
Model_name=Mustang,
Exterior_color=red,
Body_style=convertible }

In use, a mapping between the human-specified values/characteristics and the correct corresponding attribute is required in order to enable an unambiguous and effective (i.e., few or no false hits) computer-aided search of a large structured data search space.

Thus, what is desired is a method and apparatus to confirm the mapping between the human-specified values/characteristics and the correct correspondence to characteristics found in an entity description (e.g. product, service, or information), among other techniques to overcome the above prior art problems (as well as other prior art problems not mentioned).

SUMMARY

One embodiment involves a method and apparatus for mapping lexical keywords into entity description semantics in order to create unambiguous buyer-confirmed descriptions of entities. The method described herein relies on a computer program and some mechanism for computer data storage.

BRIEF DESCRIPTION OF DRAWINGS

FIG. 5 depicts an example of a computer-parsable description of hierarchical category description.

FIG. 6 depicts an example of a computer-parsable representation of an item description.

FIG. 7 depicts an example of a computer-parsable representation of the ranking of importance of an item attribute.

DETAILED DESCRIPTION

Figure 1:
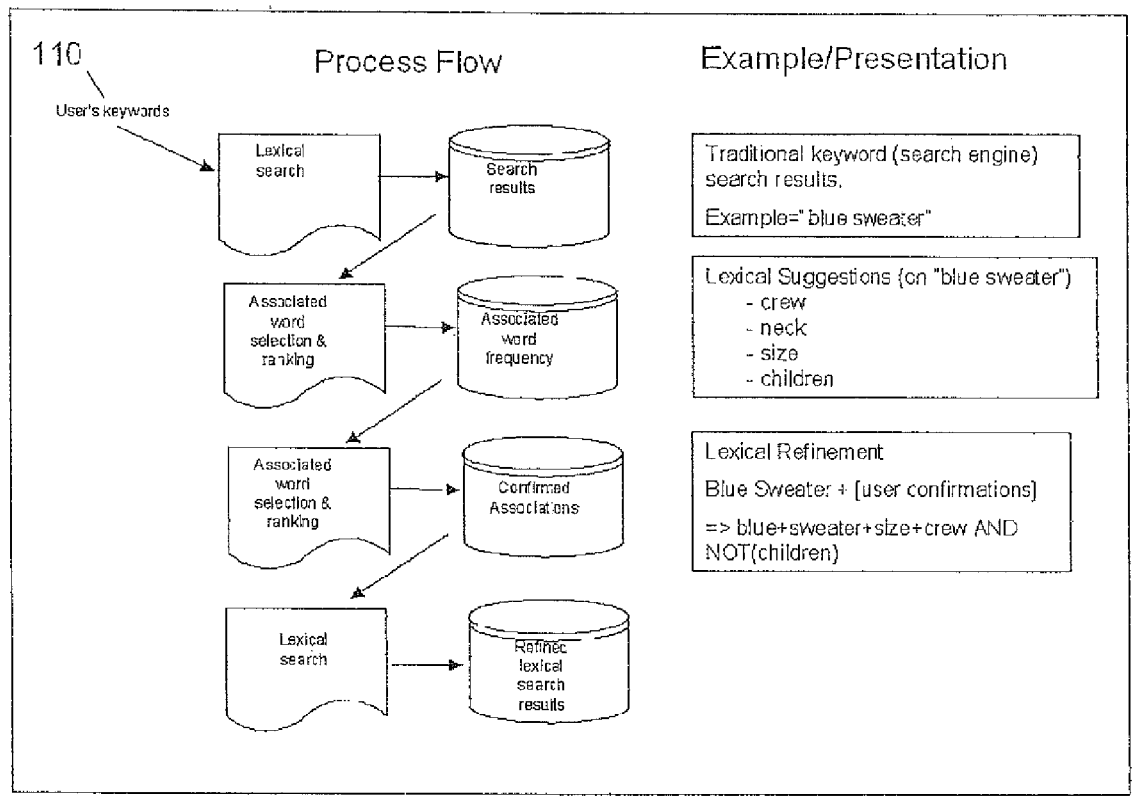
FIG. 1 depicts the process flow and data storage as is commonly used in text searches.

One method defined in the present embodiment may include the following inputs:

A list of one of more text strings (110) as have been provided by the buyer as applicable to the search underway.

This list may contain one or more words specifically excluded as a result of the lexical keyword refinement.

A database (210) containing the union of all known entity category descriptions, which may occur as an enumerated list of hierarchical category descriptions, or in a formal language that permits computer-aided enumeration. An example using a human-readable formal language to describe the levels of the hierarchy is provided in FIG. 5.

A database (240) containing buyer profiles.

A database (350) containing entity descriptions. An example of an entity description is given in FIG. 6.

A database (355) containing a relative scoring of entity attributes. Such scoring is based on the empirical or human-entered likelihood of a particular attribute being important to a buyer in search of that entity. An example of this scoring database is given in FIG. 7.

Figure 8:
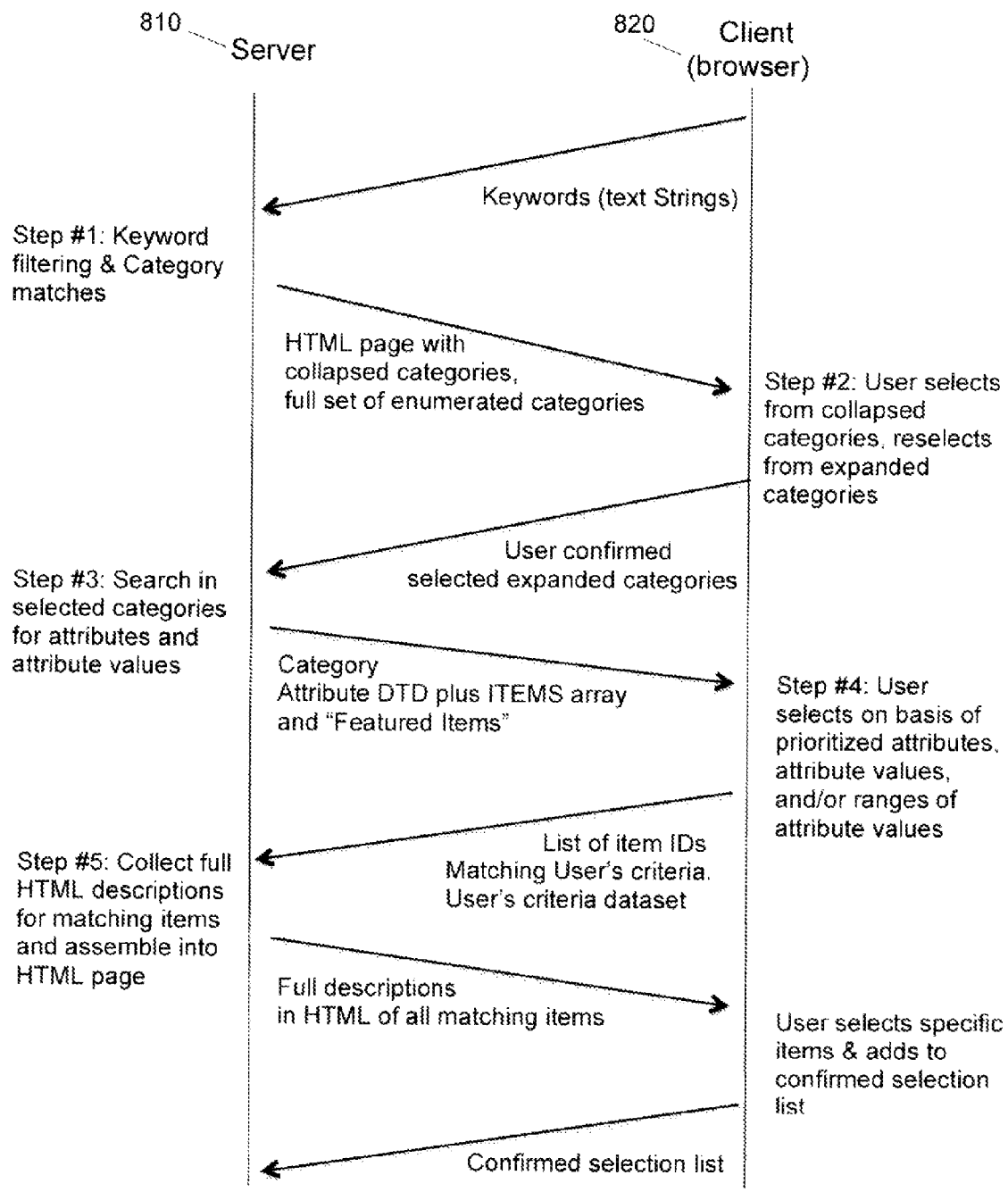
FIG. 8 depicts the key protocol exchanges between Server and Client
Figure 9:
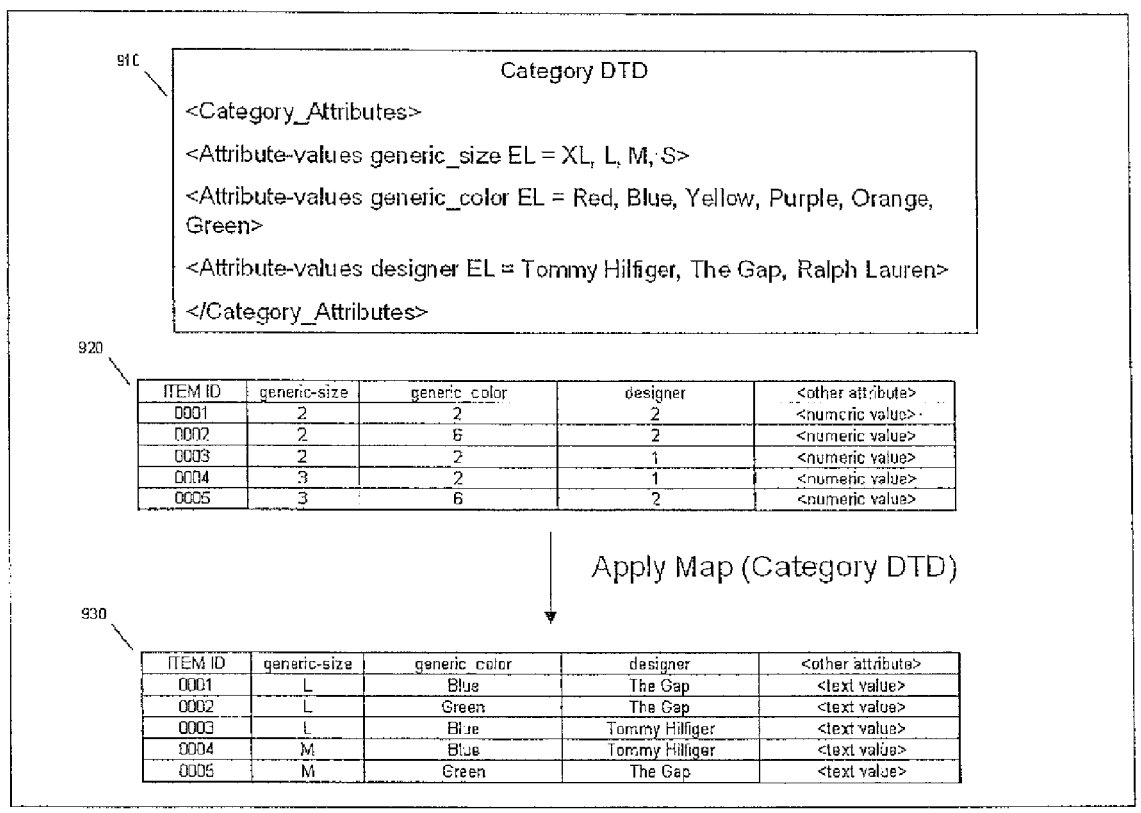
FIG. 9 depicts examples of
a computer-parsable representation of Category Attribute DTD
a compressed format of the ITEMS ARRAY, and
an expansion of the ITEMS ARRAY into a textual/human-readable format.

With these inputs then, the mapping from buyer-provided keywords to buyer-confirmed product descriptions occurs through the client-server protocol exchanges of FIG. 8, and more specifically through application of the following operations:

Operation #1:

Given a list of one or more text strings, possibly including buyer-excluded strings, the process (220) scores the quality of the mapping of the text strings against each of the hierarchical category description expansions. For example, given the strings "sweater large crew NOT(children)", the process (220) may return a high score (i.e., matching to hierarchical levels) for the following hierarchical category descriptions:

(A) apparel.men.outerwear.sweater (high score because two of the given strings match)

(B) apparel.women.outerwear.sweater (lower score because only one of the given strings match)

There is also a set of hierarchical category descriptions (e.g., apparel.children.boy.outerwear.sweater) that may receive a low scoring of quality of match due to occurrence of one or more excluded words found in the hierarchical category description.

Finally there is the set of hierarchical category descriptions that receive a zero score due to no matches of the strings found in the hierarchical category descriptions.

In one embodiment of this operation, words/strings that are known to be attribute values (e.g., names of colors) and are not likely to be found in any hierarchical category description, are pre-screened from the scoring process, thus reducing compute time required for this operation.

In another embodiment of this operation, one of many scoring algorithms is selected on the basis of the profile (e.g. record in database 240) of a returning buyer, specifically the process 220 increases the score of a particular category description if that category description had been confirmed by the buyer in a previous search. For example, a returning customer with the keyword string "box seat tickets" who had on previous occasions purchased tickets for theatre performances would more likely see theatre-related ticket categories at the top of the list rather than say tickets for Hockey games.

Figure 2:
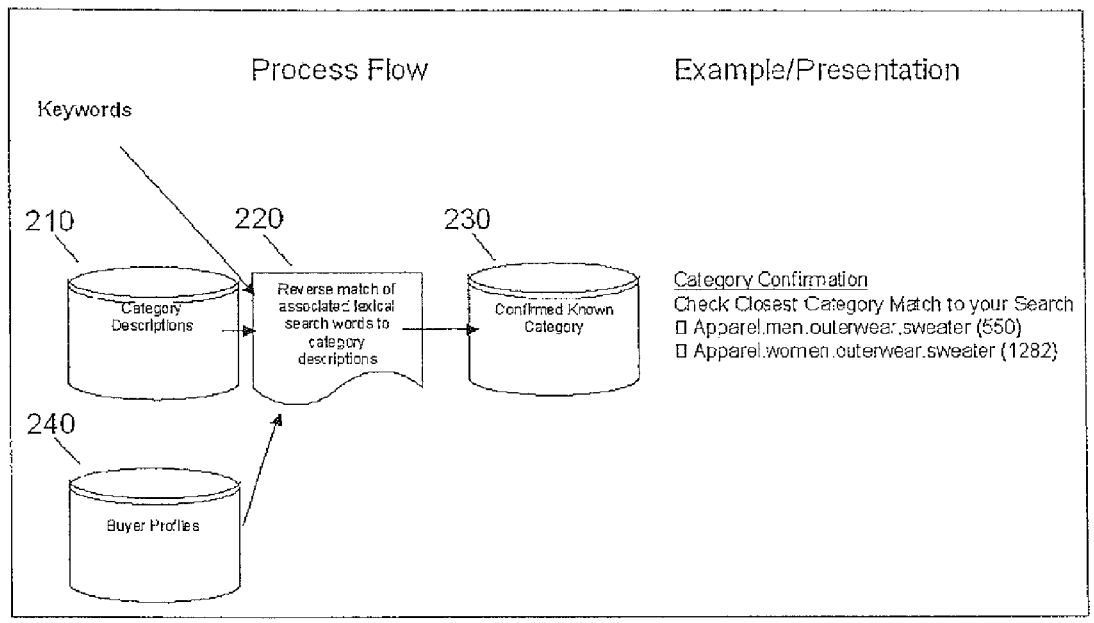
FIG. 2 depicts the data storage elements, processes and examples of semantic category extraction and category confirmation.

Operation #2:

The highest scoring hierarchical category descriptions are presented to the buyer in order of highest score toward lowest score. The buyer is then given the opportunity to select the best match of the hierarchical category description as compared to the entity the buyer seeks. In the example:

apparel.men.outerwear.sweater
apparel.men.sportswear.sweater
apparel.men.holiday.sweater
apparel.women.outerwear.sweater
apparel.women.sportswear.sweater
apparel.women.holiday.sweater
apparel.children.outerwear.sweater
apparel.children.sportswear.sweater
apparel.children.holiday.sweater
entertainment.live-events.tickets.blue-man-group In one embodiment of this operation, the number of entities in the entity database (350) that correspond to a particular category is displayed to the buyer, thus providing a technique of positive feedback during the search refinement. An example of this is shown in FIG. 2.

In another embodiment of this operation a logically contiguous set of matching categories (known as a category group) are selectively collapsed so as to reduce the number of enumerated matching categories to a smaller set and thus facilitate display to the buyer. In our example, "blue sweater" would match the following ten (10) fully enumerated categories:

apparel.men.outerwear.sweater
apparel.men.sportswear.sweater
apparel.men.holiday.sweater
apparel.women.outerwear.sweater
apparel.women.sportswear.sweater
apparel.women.holiday.sweater
apparel.children.outerwear.sweater
apparel.children.sportswear.sweater
apparel.children.holiday.sweater
entertainment.live-events.tickets.blue-man-group In order to display matched categories in a limited display space, we may wish to collapse the categories. Observe that the first nine (9) fully enumerated categories belong to a category group. The collapsed set may thus be reduced to four (4) categories:

apparel.men . . . sweater <collapsed from outerwear, sportswear and holiday>
apparel.women . . . sweater <collapsed from outerwear, sportswear and holiday>
apparel.children . . . sweater <collapsed from outerwear, sportswear and holiday>
entertainment.live-events.tickets.blue-man-group In another embodiment of this operation, if a category group was collapsed in order to reduce the number of matching categories, and the buyer selects from among one or more collapsed category groups, the next level(s) of expansion are presented to the buyer for confirmation. For example, if the buyer confirmed the collapsed category "apparel.men . . . sweater", the corresponding fully enumerated categories are presented for confirmation. Thus, following our example:

apparel.men.outerwear.sweater
apparel.men.sportswear.sweater
apparel.men.holiday.sweater For the purpose of continuing with our example though the following operations, let us assume the buyer selects the category:

apparel.men.outerwear.sweater.

The buyer-selected category is stored in the storage (230) for use in subsequent operations.

Operation #3:

At the conclusion of Operation #2, the category description to the lowest level of hierarchy is known (that is, the category is known down to that level where no further hierarchical levels are defined). With this confirmed knowledge that the buyer intends to pursue a search for entities in the specified category, the process (360) makes suggestions to the buyer of most important search parameters (i.e., attributes). The order of presentation to the buyer of the attributes is determined on the basis of:

The frequency of occurrence of a particular entity attribute as found in the entity descriptions database (350), and/or The value of the Attribute Quotient Database entry for a particular entity attribute (355)

The process (360) may scan entity entries found in the Entity Database (350) that are entities corresponding to the category selected in Operation #2. The process (360) may assemble and rank attributes found in those entries and suggest to the buyer a set of attributes most frequently found. In the example, since the buyer selected apparel.men.outerwear.sweater (during Operation #2), the set of attributes displayed to the buyer would include:

{generic_color, size, generic_style, manufacturer_name, manufacturer_product_name}.

In another embodiment, the Attribute Quotient Database entry for a particular entity attribute is stored as an array whereby the index of the array corresponds to a particular class of buyer (e.g., an X-generation consumer, a Y-generation consumer, a business-to-business buyer) and each value in the array (i.e., the Attribute Quotient) is determined by behaviors or characteristics of the class of buyer. For example, Y-generation consumers statistically choose The Gap over other designers, while X-generation consumers statistically prefer Ralph Lauren over other designers. The Attribute Quotient Database thus influences the ordering of Category Attributes and the Values of those Category Attributes for presentation to the Buyer in Operation #4.

In one embodiment, the Server (810) of FIG. 8 sends to the Client (820)

a) structured text in a form similar to the Category Attribute DTD (910) and b) a computer representation of the Items Array (920).

Thus the Client is able to display the Items Array in a human-readable format (930) using a graphical user interface as further described in Operation #b 4.

Operation #4:

The buyer is then provided a technique to rank the buyer's relative importance/ranking of the one or more attributes presented for this particular search.

In another embodiment of this Operation #4, one or more graphical user interface devices are presented to the buyer in order to aid buyer ranking of the relative importance of the attributes.

In another embodiment of this Operation #4, the buyer may be offered a choice to select from one or more predefined search parameters that uniquely identify a product (e.g., SKU, or SKU plus color code). Alternatively, in one embodiment, the process 360 may suggest one or more matching Featured Item, and offer the buyer the chance to purchase the corresponding Featured Item.

In another embodiment, the attributes are displayed dynamically, where each successive click results in a new dynamically generated screen that shows the buyer-selected ranking of the attributes. Multiple iterations of buyer clicks followed by repainting of the screen result in a final dynamically generated screen showing all of the buyer-selected attributes in order of importance to the buyer.

At this point in Operation #4, the buyer has either confirmed buyer's desire to search for matching entities based on an exact match to a SKU (e.g. the buyer selected a Featured Item), or the buyer has confirmed the relative importance of specific attributes in the parametric search.

In the Operation #4 process 420 the buyer is aided to identify prioritized choices ($1^{st}$ choice, $2^{nd}$ choice, etc.) of values or ranges of values desired (e.g., the availability of a sweater in 'generic_color=blue' is acceptable as a first choice and availability in 'generic_color=green' is acceptable as a second choice).

In one embodiment, one or more graphical user interface device(s) are presented to the buyer in order to aid buyer's selection of one or more values or ranges of values of attributes.

In another embodiment, the attribute values are displayed dynamically, where each successive click results in a new dynamically generated screen that shows the buyer-selected ranking of the attribute values. Multiple iterations of buyer clicks followed by repainting of the screen results finally in a dynamically generated screen showing all of the buyer-selected attribute values in order of importance to the buyer.

Operation #5:

At the conclusion of Operation #4, the buyer has either confirmed time precedence of attributes and has indicated preferred values on the basis of actual items available and/or indicated acceptable ranges of values of attributes. An organized array of matching items are presented to the buyer for purchase. In the event the buyer elects not to conclude a transaction, the buyer is given the opportunity to 'save' the confirmed criteria (possibly including acceptable ranges for certain attribute values) for subsequent searches. The buyer is presented with options for computer-aided actions to be taken on behalf of the buyer in subsequent searches.

In one embodiment, the buyer is given the opportunity to select one from a group of rule sets, each set containing the rules of exchange including currency designation, exchange rate authority and limits, and a description of acceptable payment instruments (e.g., credit card, P.O., PayPal, etc).

In another embodiment, the buyer's search requirements can be stored in a computer memory and acted on or accessed at a later time. Future action by computer acting as agent for the buyer may inform the buyer of a (newly identified) match or the computer acting as agent for the buyer may perform the transaction on behalf of the buyer.

Following are various optional features that may be optionally included in various embodiments:

The method of FIG. 1 whereby the buyer's keywords are filtered to eliminate low value words such as articles ('a', 'the', 'an'), connectives and prepositions.

The method of FIG. 1 whereby in case of the presence of unambiguous keywords, those keywords are mapped to synonyms known to be in more common use (e.g., the words "clothing" gets mapped to the synonym "apparel".

The method of FIG. 1 whereby a match of the buyer's keywords to category descriptions receive a higher score on the basis of previous full or partial matches as may be recorded in the buyer's profile record.

Category Descriptions of FIG. 2 whereby the hierarchy of the category descriptions are described in XML.

Category Descriptions of FIG. 2 whereby the hierarchy of the category descriptions are organized as a map of a department store.

Category Descriptions of FIG. 2 whereby the basic item description is in the form of the AART Product XML dictionary.

A technique whereby the buyer is presented with a graphical user interface page containing three (3) independent frames/areas: (a) the text search area, (b) the refinement/feedback area, and (c) the browsing/results area.

The method of FIG. 2 whereby the hierarchical/category description is confirmed by the buyer using a graphical user interface.

Figure 3:
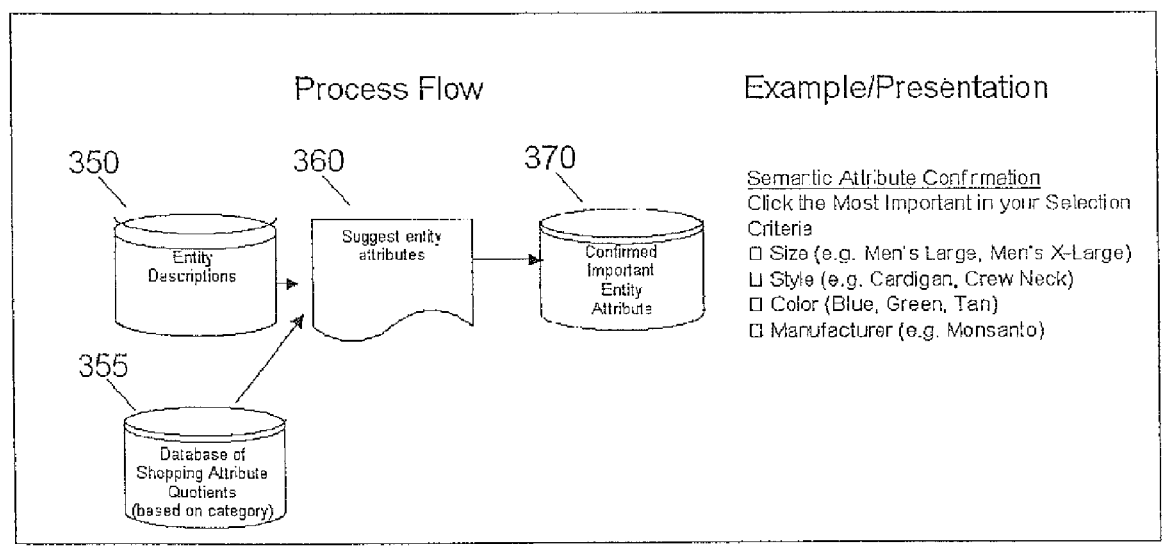
FIG. 3 depicts the data storage elements, process and examples of semantic attribute extraction and category attribute confirmation.

The method of FIG. 3 whereby the buyer can exit the parametric search at any time and go directly to browsing mode (as described in item 'c' above).

The method of FIG. 3 whereby item attributes (and a selection of values) are proposed to the buyer on the basis of the frequency of occurrence of an attribute being found among the union of items in that confirmed category description.

Figure 4:
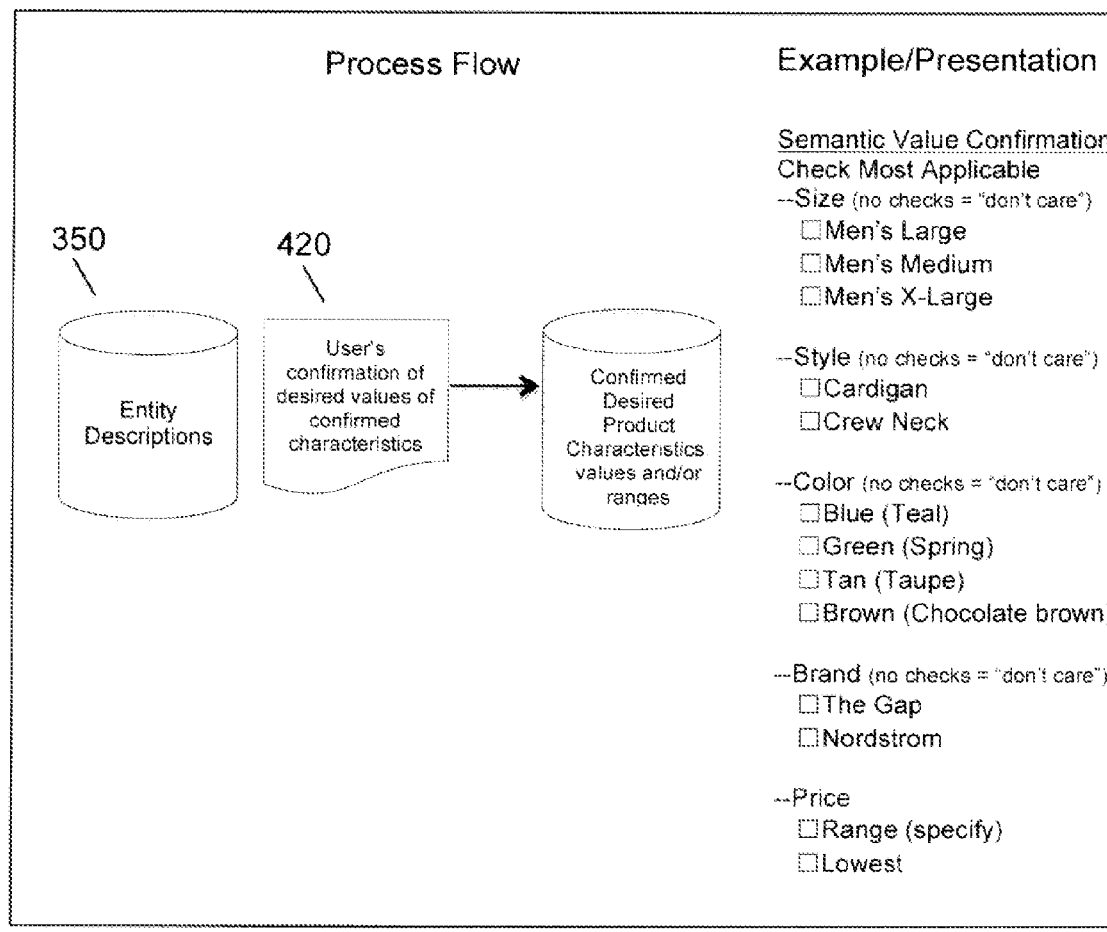
FIG. 4 depicts the data storage elements, process and examples of semantic attribute value extraction and category attribute value continuation.

The method of FIG. 4 whereby the Entity Description database (350) contains the rules of exchange including currency designation, exchange rate authority and limits, and a description of acceptable payment instruments (e.g., credit card, P.O., PayPal, etc).

Search criteria/results derive guidance for next operation(s) in the search process whereby at any point during execution of processes 210, 310, 360, or 420 a list of products known to have similar attributes to buyer's criteria are presented to buyer in a browsable window or frame.

The method of FIG. 4 whereby the value or range of values of an attribute are confirmed by the buyer through a graphical user interface.

The automatic generation of database 355 whereby the database is generated over time, using actual search results and by capture and analysis of actual buyers' behaviors.

Those skilled in the art may now recognize that the search space has been reduced from the broad class of retrievable entities that may match one or more text-only keywords, down to a search for one or more entities that belong to a known, unambiguous and specific category, and further, that a match between the buyer's search criteria and entities can be made on the basis of a scoring system, whereby an exact match is not a necessary condition required before presenting the matching entities to the buyer.

The invention claimed is:

1. A server-implemented method of returning results responsive to a search entered by a user through computer-parsable graphical user interface pages, the method comprising:
    accessing, from stored first database records, category descriptions of items potentially responsive to the search, at least some of the category descriptions comprising two or more item attributes of a respective item;
    accessing, from stored second database records, an entity description for at least some of the items potentially responsive to the search, the entity description comprising at least one value assigned to each item attribute of the two or more item attributes;
    executing at least a portion of a client-server protocol to send, over a network, a first computer-parsable graphical user interface page displayable on a client computer coupled to the network, the first computer-parsable graphical user interface page comprising an interface to a search engine executing a computerized search function, wherein the interface to the search engine has a text search area to capture user input constituting the search;
    performing a lexical search on the user input constituting the search using the search engine to return search results from a search corpus accessible by the search engine;
    executing at least another portion of the client-server protocol to send a second computer-parsable graphical user interface page; to display at least some of the search results on the client computer;
    receiving an input word list selection by the user, wherein at least one word of the selected input word list comprises a value or a range of values of an attribute of the items potentially responsive to the search;
    scoring at least some of the category descriptions, the scoring determined at least in part by mapping at least one word of the selected input word list against corresponding entity descriptions to form a plurality of scored category descriptions, wherein an occurrence of one or more lexical matches constitutes a mapping;
    sending a third computer-parsable graphical user interface page to display at least some of the scored category descriptions based at least in part on the mapping;
    receiving a selected category description of the at least some of the scored category descriptions;
    sending a fourth computer-parsable graphical user interface page to display, on the client computer, suggested item attributes and suggested item attribute values based at least in part on the selected category description;
    receiving from the user, in response to the displayed suggested item attributes, a selection of the suggested item attribute values of the selected category description;
    iteratively displaying to the user, after respective inputs from the user, a value or a range of values for at least some of the suggested item attribute values of the selected category description until the user has selected one of a preferred value or acceptable range of values for at least some of the suggested item attribute values, wherein at least some of the respective inputs by the user causes a dynamic generation of the preferred value or the acceptable range of values; and
    sending a fifth computer-parsable graphical user interface page to display, on the client computer, matching items corresponding to at least some of the preferred value or the acceptable range of values from the search corpus to enable selection by the user of a final selected item, wherein the matching items comprise at least a portion of the results responsive to the search.

2. The method of claim 1 wherein one or more user selections comprises a confirmation of iterative precedence of attributes by the user.

3. The method of claim 1 further comprising:
    accessing, from stored third database records a plurality of buyer profiles for respective buyers, the buyer profiles comprising at least in part confirmation of category descriptions in a previous search by a respective buyer; and
    selecting a scoring algorithm on the basis of a buyer profile stored in the third database records.

4. The method of claim 1 further comprising increasing the scoring of the at least some of the category descriptions based at least in part on results of a previous search.

5. The method of claim 1 wherein the mapping is performed to a lowest level of category descriptions below which no further levels of category descriptions are defined.

6. The method of claim 1 further comprising: assigning a category attribute quotient comprising a number for each value assigned to each item attribute; and storing each category attribute quotient in an array that is indexed against a behavior or characteristic of a class of user regarding the respective item attribute, and wherein the category attribute quotient for each value determines an ordering of category attributes and respective values for display to the user.

7. The method of claim 1 wherein the graphical user interface page comprises a hypertext markup language (HTML)-based page accessible over the network coupling the client computer to a server computer.

8. The method of claim 7 wherein user input receiving steps are performed on the client computer and the search engine is performed on the server computer.

9. The method of claim 1 wherein the selection of the suggested item attribute values of the selected category description is selected by the user in a specific order.

10. The method of claim 1 further comprising presenting, on the client computer, a browsing area displayed within the first computer-parsable graphical user interface page, wherein the browsing area is accessible at least upon exit of the search by the user.

11. A physical, non-transitory computer readable medium having stored thereon instructions that when executed by a processor-based computing device implement a server-based method of returning results responsive to a search entered by a user through computer-parsable graphical user interface pages, comprising:

accessing, from stored first database records, category descriptions of items potentially responsive to the search, at least some of the category descriptions comprising two or more item attributes of a respective item;

accessing, from stored second database records, an entity description for at least some of the items potentially responsive to the search, the entity description comprising at least one value assigned to each item attribute of the two or more item attributes;

executing at least a portion of a client-server protocol to send, over a network, a first computer-parsable graphical user interface page displayable on a client computer coupled to the network, a first computer-parsable graphical user interface page; to present, on a client computer the graphical user interface page, the first computer-parsable graphical user interface page comprising an interface to a search engine executing a computerized search function, wherein the interface to the search engine has a text search area to capture user input constituting the search;

performing a lexical search on the user input constituting the search using the search engine to return search results from a search corpus accessible by the search engine;

executing at least another portion of a client-server protocol to send a second computer-parsable graphical user interface page; to display at least some of the search results on the client computer;

receiving an input word list selection by the user, wherein at least one word of the selected input word list comprises a value or a range of values of an attribute of the items potentially responsive to the search;

scoring at least some of the category descriptions, the scoring determined at least in part by mapping at least one word of the selected input word list against corresponding entity descriptions to form a plurality of scored category descriptions, wherein an occurrence of one or more lexical matches constitutes a mapping;

sending a third computer-parsable graphical user interface page to display at least some of the scored category descriptions based at least in part on the mapping;

receiving a selected category description of the at least some of the scored category descriptions;

sending a fourth computer-parsable graphical user interface page to display, on the client computer, suggested item attributes and suggested item attribute values based at least in part on the selected category description;

receiving from the user, in response to the displayed suggested item attributes, a selection of the suggested item attribute values of the selected category description;

iteratively displaying to the user, after respective inputs from the user, a value or a range of values for at least some of the suggested item attribute values of the selected category description until the user has selected one of a preferred value or acceptable range of values for at least some of the suggested item attribute values, wherein at least some of the respective inputs by the user causes a dynamic generation of the preferred value or the acceptable range of values; and sending a fifth computer-parsable graphical user interface page to display, on the client computer, matching items corresponding to at least some of the preferred value or the acceptable range of values from the search corpus to enable selection by the user of a final selected item wherein the matching items comprise at least a portion of the results responsive to the search.

12. A system for returning results responsive to a search entered by a user through computer-parsable graphical user interface pages, the system comprising:

a server computer component accessing, from stored first database records, category descriptions of items potentially responsive to the search, at least some of the category descriptions comprising two or more item attributes of a respective item; and accessing, from stored second database records, an entity description for at least some of the items potentially responsive to the search, the entity description comprising at least one value assigned to each item attribute of the two or more item attributes;

another server computer component executing at least a portion of a client-server protocol to send, over a network, a first computer-parsable graphical user interface page displayable on a client computer coupled to the network, the first computer-parsable graphical user interface page comprising an interface to a search engine executing a computerized search function, wherein the interface to the search engine has a text search area to capture user input constituting the search;

a search engine performing a lexical search on the user input constituting the search to return search results from a search corpus accessible by the search engine;

a yet further server computer component executing at least another portion of the client-server protocol to send a second computer-parsable graphical user interface page; to display at least some of the search results on the client computer, and receiving an input word list selection by the user, wherein at least one word of the selected input word list comprises a value or a range of values of an attribute of the items potentially responsive to the search;

a scoring component scoring at least some of the category descriptions by, at least in part mapping at least one word of the selected input word list against corresponding entity descriptions to form a plurality of scored category descriptions, wherein an occurrence of one or more lexical matches constitutes a mapping;

a yet another server computer component sending a third computer-parsable graphical user interface page to display at least some of the scored category descriptions based at least in part on the mapping; receiving a selected category description of the at least some of the scored category descriptions; sending a fourth computer-parsable graphical user interface page to display, on the client computer, suggested item attributes and suggested item attribute values based at least in part on the selected category description; receiving from the user, in response to the displayed suggested item attributes, a selection of the suggested item attribute values of the selected category description; iteratively displaying to the user, after respective inputs from the user, a value or a range of values for at least some of the suggested item attribute values of the selected category description until the user has selected one of a preferred value or acceptable range of values for at least some of the suggested item attribute values, wherein at least some of the respective inputs by the user causes a dynamic generation of the preferred value or the acceptable range of values; and sending a fifth computer-parsable graphical user interface page to display, on the client computer, matching items corresponding to at least some of the preferred value or the acceptable range of values from the search corpus to enable selection by the user of a final selected item, wherein the matching items comprise at least a portion the results responsive to the search.

13. The system of claim 12 wherein one or more user selections comprises a confirmation of iterative precedence of attributes by the user.

14. The system of claim 12 wherein the server computer component accesses from stored third database records a plurality of buyer profiles for respective buyers, the buyer profiles comprising at least in part confirmation of category descriptions in a previous search by a respective buyer, and selects a scoring algorithm on the basis of a buyer profile stored in the third database records.

15. The system of claim 14 wherein the server computer component increases the scoring of the at least some of the category descriptions based at least in part on results of a previous search.

16. The system of claim 12 wherein the mapping is performed to a lowest level of category descriptions below which no further levels of category descriptions are defined.

17. The system of claim 12 wherein the server computer component assigns a category attribute quotient comprising a number for each value assigned to each item attribute; and stores each category attribute quotient in an array that is indexed against a behavior or characteristic of a class of user regarding the respective item attribute, and wherein the category attribute quotient for each value determines an ordering of category attributes and respective values for display to the user.

18. The system of claim 12 wherein the selection of the suggested item attribute values of the selected category description is selected by the user in a specific order.

19. The system of claim 12 wherein the a client-server protocol comprises at least in part a hypertext markup language (HTML) protocol, the interface component further presenting, on the client computer, a browsing area displayed within the first computer-parsable graphical user interface page, wherein the browsing area is accessible at least upon exit of the search by the user.

* * * * *

UNITED STATES PATENT AND TRADEMARK OFFICE
CERTIFICATE OF CORRECTION

PATENT NO. : 9,069,860 B2  
APPLICATION NO. : 14/165342  
DATED : June 30, 2015  
INVENTOR(S) : Bruce Matesso and Richard Bridgeman Page 1 of 1

It is certified that error appears in the above-identified patent and that said Letters Patent is hereby corrected as shown below:

IN THE CLAIMS:

Claim 1 in Column 8, lines 1-4 should read:

executing at least another portion of the client-server protocol to send a second computer-parsable graphical user interface page, to display at least some of the search results on the client computer;

Signed and Sealed this
Twenty-sixth Day of July, 2016

Michelle K. Lee
*Director of the United States Patent and Trademark Office*